US 12,256,250 B2

(12) United States Patent
Choi et al.

(10) Patent No.: US 12,256,250 B2
(45) Date of Patent: Mar. 18, 2025

(54) ELECTRONIC DEVICE FOR TRANSMITTING TEST SIGNAL AND OPERATION METHOD THEREOF

(71) Applicant: Samsung Electronics Co., Ltd., Suwon-si (KR)

(72) Inventors: Chanho Choi, Suwon-si (KR); Seijoon Shim, Suwon-si (KR); Kwangjin Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 17/884,110

(22) Filed: Aug. 9, 2022

(65) Prior Publication Data

US 2022/0394524 A1 Dec. 8, 2022

Related U.S. Application Data

(63) Continuation of application No. PCT/KR2021/009066, filed on Jul. 14, 2021.

(30) Foreign Application Priority Data

Jul. 14, 2020 (KR) .................. 10-2020-0086926

(51) Int. Cl.
*H04W 24/08* (2009.01)
*H04L 5/00* (2006.01)
*H04W 16/14* (2009.01)
*H04W 72/0453* (2023.01)
*H04W 72/23* (2023.01)

(52) U.S. Cl.
CPC .......... *H04W 24/08* (2013.01); *H04L 5/0048* (2013.01); *H04W 16/14* (2013.01); *H04W 72/0453* (2013.01); *H04W 72/23* (2023.01)

(58) Field of Classification Search
CPC . H04W 24/08; H04W 16/14; H04W 72/0453; H04W 72/23; H04W 24/06;

(Continued)

(56) References Cited

U.S. PATENT DOCUMENTS 11,382,072 B2 * 7/2022 Kim ................. H04W 72/0446
2015/0188650 A1 * 7/2015 Au ........................ H04L 5/0053
370/312
2019/0207697 A1 7/2019 Ghasemzadeh et al.

FOREIGN PATENT DOCUMENTS

WO 2020/089859 A1 5/2020

OTHER PUBLICATIONS

Google Inc., Views on dynamic spectrum sharingbetween LTE band 48 and NR bandn48, 3GPP RAN WG4 Meeting #94-e R4-2002048, Feb. 24, 2020-Mar. 6, 2020.

(Continued)

*Primary Examiner* — Hashim S Bhatti
(74) *Attorney, Agent, or Firm* — Jefferson IP Law, LLP

(57) ABSTRACT

The disclosure relates to a pre-5th-Generation (5G) or 5G communication system to be provided for supporting higher data rates Beyond 4th-Generation (4G) communication system such as Long Term Evolution (LTE). An electronic device is provided. The electronic device includes a communication circuit, and a processor, wherein the processor is configured to configure configuration information for transmitting a designated test signal in a second transmission band of a new radio (NR)-based cell, the second transmission band at least partially overlapping a first transmission band of a LTE-based cell, and transmit the designated test signal based on the configuration information in the second transmission band through the communication circuit, wherein the designated test signal is transmitted in first resource elements among resource elements included in a first resource block of the second transmission band, a subcarrier of the first resource block overlaps subcarriers of resource blocks of the first transmission band among resource blocks of the second transmission band, and second resource elements other than the first resource elements (Continued)

among the resource elements included in the first resource block are occupied by a designated signal for LTE.

20 Claims, 12 Drawing Sheets

(58) Field of Classification Search
CPC ... H04L 5/0048; H04L 5/0044; H04L 5/0094; H04L 1/24; H04L 5/0005; H04L 5/005; H04L 5/0051; H04L 5/04; H04L 5/14
See application file for complete search history.

(56) References Cited

OTHER PUBLICATIONS

Nokia, TEI16: Enhancements to Dynamic Spectrum Sharing, 3GPP TSG RAN WG1 Meeting #98 R1-1908708, Prague, Czech Republic, Aug. 26-30, 2019.
Real 5G UE measurements—achieving gigabit speeds, Dec. 12, 2019.
Nokia et al., Views on band 48/n48 spectrum sharing, 3GPP TSG-WG RAN4 Meeting #94-e R4-2001043, Feb. 24-Mar. 6, 2020.
Samsung, Discussion on spectrum sharing among band 41/n41, 3GPP TSG-RAN WG4 Meeting #91 R4-1905463, Reno, US, May 13-17, 2019.
Indian Office Action dated Mar. 13, 2024, issued in Indian Patent Application No. 202337008716.
5G NR and 4G LTE Coexistence, A Comprehensive Deployment Guide to Dynamic Spectrum Sharing, Mar. 3, 2020.
Huawei et al., Coexistence of NR DL and LTE, R1-1703559, 3GPP TSG RAN WG1 Meeting #88, Athens, Greece, Feb. 15, 2017.
Extended European Search Report dated Jul. 26, 2023, issued in European Patent Application No. 21843164.1.

\* cited by examiner

ELECTRONIC DEVICE FOR TRANSMITTING TEST SIGNAL AND OPERATION METHOD THEREOF

CROSS-REFERENCE TO RELATED APPLICATION(S)

This application is a continuation application, claiming priority under § 365(c), of an International application No. PCT/KR2021/009066, filed on Jul. 14, 2021, which is based on and claims the benefit of a Korean patent application number 10-2020-0086926, filed on Jul. 14, 2020, in the Korean Intellectual Property Office, the disclosure of which is incorporated by reference herein in its entirety.

BACKGROUND

1. Field

The disclosure relates to an electronic device for transmitting a test signal and an operation method thereof.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long-term Evolution (LTE) System'.

The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in the 5G communication systems.

In addition, in the 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (QAM) (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that may transmit a test signal for assessing a new radio (NR) base station signal in a dynamic spectrum sharing (DSS) environment.

Another aspect of the disclosure is to provide an electronic device that may transmit a test signal for assessing an NR base station signal according to a designated modulation technique in a designated frequency area.

Additional aspects will be set forth in part in the description which follows and, in part, will be apparent from the description, or may be learned by practice of the presented embodiments.

The technical subjects pursued in the disclosure may not be limited to the above-mentioned technical subjects, and other technical subjects which are not mentioned may be clearly understood, through the following descriptions, by those skilled in the art to which the disclosure pertains.

In accordance with an aspect of the disclosure, an electronic device is provided. The electronic device includes a communication circuit, and a processor, wherein the processor is configured to configure configuration information for transmitting a designated test signal in a second transmission band of a new radio (NR)-based cell, the second transmission band at least partially overlapping a first transmission band of a long-term evolution (LTE)-based cell, and transmit the designated test signal based on the configuration information in the second transmission band through the communication circuit, wherein the designated test signal is transmitted in first resource elements among resource elements included in a first resource block of the second transmission band, a subcarrier of the first resource block overlaps subcarriers of resource blocks of the first transmission band among resource blocks of the second transmission band, and second resource elements other than the first resource elements among the resource elements included in the first resource block are occupied by a designated signal for LTE.

In accordance with another aspect of the disclosure, an operation method of an electronic device is provided. The operation method includes configuring configuration information for transmitting a designated test signal in a second transmission band of a new radio (NR)-based cell, the second transmission band at least partially overlapping a first transmission band of a long-term evolution (LTE)-based cell, and transmitting the designated test signal based on the configuration information in the second transmission band, wherein the designated test signal is transmitted in first resource elements among resource elements included in a first resource block of the second transmission band, a subcarrier of the first resource block overlaps subcarriers of resource blocks of the first transmission band among resource blocks of the second transmission band, and second resource elements other than the first resource elements among the resource elements included in the first resource block are occupied by a designated signal for LTE.

An electronic device and an operation method thereof according to an embodiment may transmit a test signal for assessing an NR base station signal in a dynamic spectrum sharing (DSS) environment.

An electronic device and an operation method thereof according to an embodiment may transmit a test signal for assessing an NR base station signal according to a designated modulation technique in a designated frequency area.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
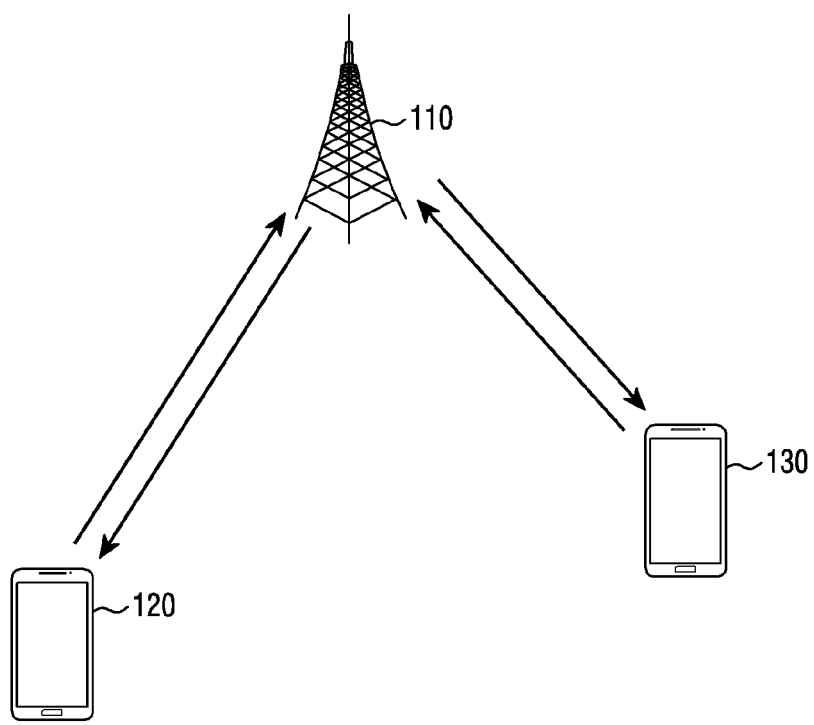
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, embodiments of the disclosure will be described based on an approach of hardware. However, embodiments of the disclosure include a technology that uses both hardware and software, and thus the embodiments of the disclosure may not exclude the perspective of software.

As used in the following description, terms referring to signals, terms referring to channels, terms referring to control information, terms referring to network entities, terms referring to device elements, and the like are illustratively used for the sake of convenience. Therefore, the disclosure is not limited by the terms as used below, and other terms having equivalent technical meanings may be used.

Hereinafter, a physical channel and a signal may be interchangeably used with data or a control signal. For example, a physical downlink shared channel (PDSCH) is a term referring to a physical channel through which data is transmitted, but the PDSCH may be also used to refer to data.

Hereinafter, higher signaling indicates a method of transmitting a signal from a base station to a terminal by using a downlink data channel of a physical layer, or a method of transmitting a signal from a terminal to a base station by using an uplink data channel of a physical layer. The higher signaling may be understood to be radio resource control (RRC) signaling or a medium access control (MAC) control element (CE).

Furthermore, in the disclosure, although the expression "more than" or "less than" is used in order to determine whether or not a specific condition is satisfied or fulfilled, this is merely intended to express an example, and this does not exclude the meaning of "equal to or more than" or "equal to or less than". A condition described as the expression "equal to or more than" can be replaced with the expression "more than", a condition described as the expression "equal to or less than" can be replaced with the expression "less than", and a condition described as the expression "equal to or more than and less than" can be replaced with the expression "more than and equal to or less than".

Furthermore, although the disclosure describes an embodiment using terms used in some communication standards (e.g., 3rd Generation Partnership Project (3GPP)), these are merely illustrative examples. An embodiment can be easily modified and applied to other communication systems as well.

FIG. 1 illustrates a wireless communication system according to an embodiment of the disclosure.

Referring to FIG. 1, a base station 110, a terminal 120, and a terminal 130, as a part of nodes using a wireless channel in a wireless communication system is illustrated.

The base station 110 is a network infrastructure for providing radio access to the terminals 120 and 130. In an embodiment, the base station 110 has a coverage defined as a predetermined geographical region based on a distance within which a signal is transmitted. In an embodiment, the base station 110 may be referred to as an "access point (AP)", an "eNodeB (eNB)", a "5th generation (5G) node", a "gNodeB (a next generation nodeB or a gNB)", a "wireless point", a "transmission/reception point (TRP)", or other terms having equivalent technical meanings to those of the above-described terms, in addition to the base station.

In an embodiment, the base station 110 may transmit a test signal. In an embodiment, the base station 110 may transmit a designated test signal by using designated configuration information. In an embodiment, the configuration information may be information for configuring a modulation scheme of the test signal. In an embodiment, the configuration information may be information for configuring a channel and/or a signal related to the test signal. In an embodiment, the configuration information may be information for configuring the location of a resource occupied by the test signal (e.g., an orthogonal frequency division multiplexing (OFDM) symbol index and/or subcarrier index). In an embodiment, the configuration information may include information for configuring information using designated processing (e.g., scrambling) of the test signal.

In an embodiment, the terminal 120 and the terminal 130 may receive a test signal of the base station 110. In an embodiment, the terminal 120 and the terminal 130 may output a measurement value for the test signal of the base station 110 by using an output device (e.g., a display).

Figure 2:
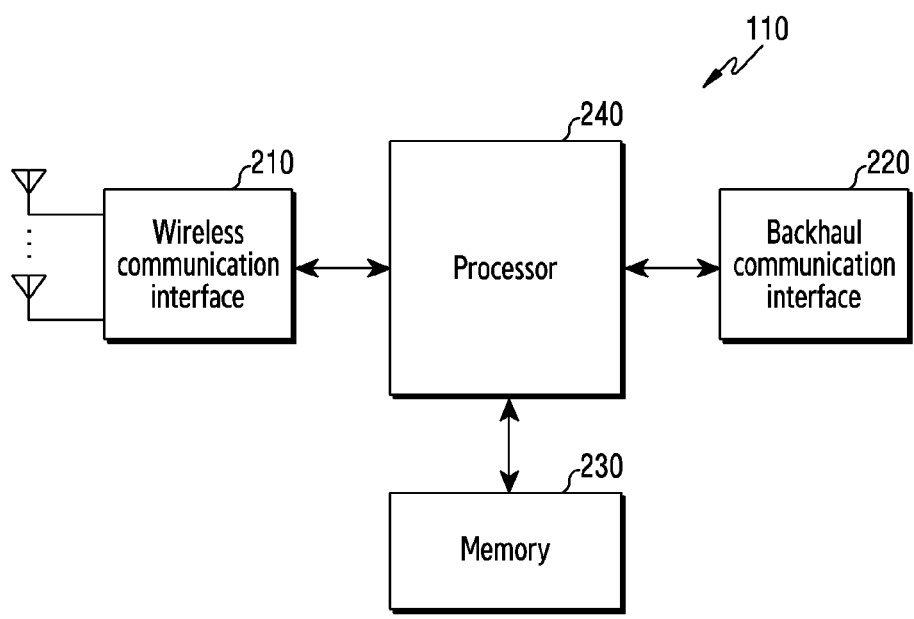
FIG. 2 illustrates a configuration of a base station in a wireless communication system according to an embodiment of the disclosure.

FIG. 2 illustrates a configuration of a base station in a wireless communication system according to an embodiment of the disclosure. The configuration illustrated in FIG. 2 may be understood as a configuration of the base station 110. The term "unit", "-or/er", or the like, to be used below may indicate a unit for processing at least one function or operation, and may be implemented by hardware, software, or a combination thereof.

Referring to FIG. 2, the base station includes a wireless communication interface 210, a backhaul communication interface 220, a memory 230, and a processor 240.

In an embodiment, the wireless communication interface 210 may perform functions for transmitting or receiving a signal through a wireless channel. In an embodiment, the wireless communication interface 210 may perform a function of conversion between a baseband signal and a bitstream according to a physical layer standard of the system. In an embodiment, when transmitting data, the wireless communication interface 210 may encode and modulate a transmission bitstream to generate complex symbols. In an embodiment, when receiving data, the wireless communication interface 210 may demodulate and decode a baseband signal to restore a reception bitstream.

In an embodiment, the wireless communication interface 210 may include a transmission filter, a reception filter, an amplifier, a mixer, an oscillator, a digital-to-analog converter (DAC), an analog-to-digital converter (ADC), or a combination thereof. In an embodiment, the wireless communication interface 210 may up-convert a baseband signal into a radio frequency (RF) band signal. In an embodiment, the wireless communication interface 210 may transmit the up-converted RF band signal through an antenna. In an embodiment, the wireless communication interface 210 may down-convert an RF band signal received through an antenna into a baseband signal. In an embodiment, the wireless communication interface 210 may include multiple transmission/reception paths. In an embodiment, the wireless communication interface 210 may include at least one antenna array including multiple antenna elements.

In an embodiment, in terms of hardware, the wireless communication interface 210 may include a digital unit and an analog unit. In an embodiment, the analog unit may include multiple sub-units according to operating power, operating frequency, and the like. In an embodiment, the digital unit may be implemented by at least one processor (e.g., a digital signal processor (DSP)).

In an embodiment, some or an entirety of the wireless communication interface 210 may be referred to as a "transmitter", a "receiver", or a "transceiver". Hereinafter, transmission and reception performed through a wireless channel are used to have a meaning including the processing performed by the wireless communication interface 210.

In an embodiment, the backhaul communication interface 220 may provide an interface for performing communication with other nodes in the network. In an embodiment, the backhaul communication interface 220 may convert a bitstream transmitted from the base station 110 to another node (e.g., another access node, another base station, a higher node, or a core network) into a physical signal. In an embodiment, the backhaul communication interface 220 may convert a physical signal received from another node into a bitstream.

In an embodiment, the memory 230 may store a basic program for operating a base station, an application program, configuration information, or data including a combination thereof. In an embodiment, the memory 230 may include a volatile memory, a nonvolatile memory, and a combination of the volatile memory and the nonvolatile memory. In an embodiment, the memory 230 provides data stored according to a request from the processor 240, to the processor 240.

In an embodiment, the processor 240 controls overall operations of the base station 110. In an embodiment, the processor 240 may transmit and/or receive a signal through the wireless communication interface 210 or the backhaul communication interface 220. In an embodiment, the processor 240 may store data in the memory 230 and/or read the stored data therefrom. In an embodiment, the processor 240 may perform functions of a protocol stack required by the communication standard. In an embodiment, the protocol stack may be included in the wireless communication interface 210. In an embodiment, the processor 240 may include at least one processor.

Figure 3:
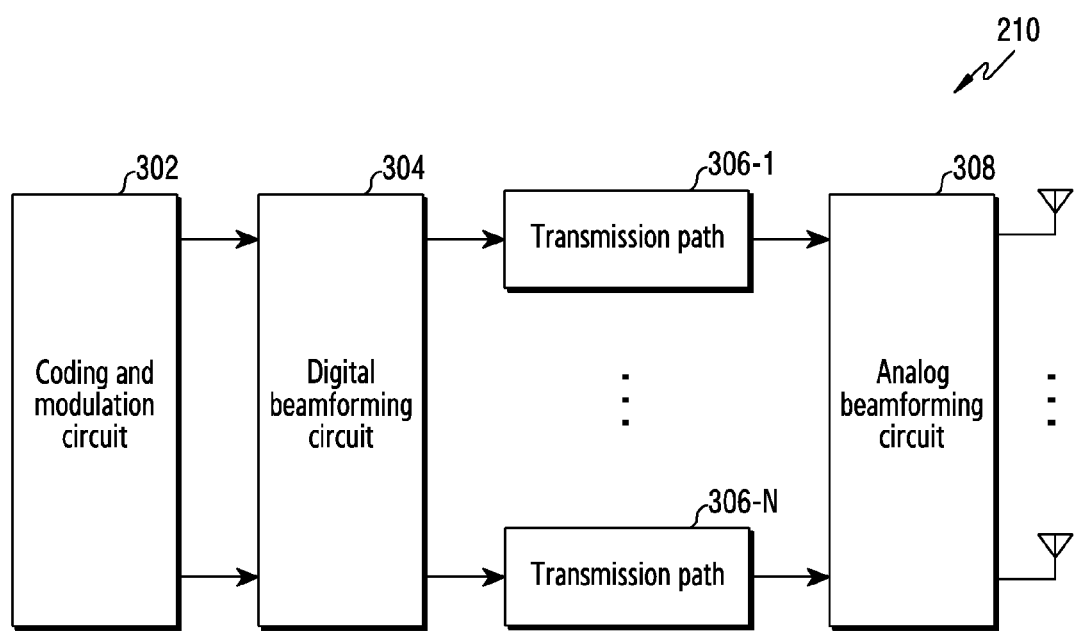
FIG. 3 illustrates a configuration of a wireless communication interface of a base station according to an embodiment of the disclosure.

FIG. 3 illustrates a configuration of the wireless communication interface 210 of the base station according to an embodiment of the disclosure. FIG. 3 illustrates a detailed configuration of the wireless communication interface 210 of FIG. 2. In an embodiment, FIG. 3 illustrates elements for performing beamforming, as a part of the wireless communication interface 210 of FIG. 2.

Referring to FIG. 3, the wireless communication interface 210 may include a coding and modulation circuit 302, a digital beamforming circuit 304, multiple transmission paths 306-1 to 306-N, and an analog beamforming circuit 308.

In an embodiment, the coding and modulation circuit 302 may perform channel encoding. In an embodiment, for the channel encoding, at least one of a low density parity check (LDPC) code, a convolution code, and a polar code may be used. In an embodiment, the coding and modulation circuit 302 may perform constellation mapping to generate complex symbols.

In an embodiment, the digital beamforming circuit 304 may perform beamforming on a digital signal (e.g., complex symbols). In an embodiment, the digital beamforming circuit 304 may perform beamforming by multiplying the modulated symbols by beamforming weights. In an embodiment, the beamforming weights may be used to change the magnitude or the phase of a signal. In an embodiment, the beamforming weights may be referred to as a "precoding matrix" or a "precoder". In an embodiment, the digital beamforming circuit 304 may output the modulated symbols having gone through the digital beamforming to the multiple transmission paths 306-1 to 306-N. In an embodiment, according to a multiple-input multiple-output (MIMO) transmission technique, the modulated symbols may be multiplexed. In an embodiment, the same modulated symbols may be provided to the multiple transmission paths 306-1 to 306-N.

In an embodiment, the multiple transmission paths 306-1 to 306-N may convert the digital signals having gone through the digital beamforming into analog signals. In an embodiment, each of the multiple transmission paths 306-1 to 306-N may include an inverse fast Fourier transform (IFFT) calculator, a cyclic prefix (CP) inserter, a DAC, and an up-converter. In an embodiment, the CP inserter may be for an orthogonal frequency division multiplexing (OFDM) scheme. In an embodiment, the CP inserter may be excluded from the multiple transmission paths 306-1 to 306-N when another physical layer scheme (e.g., a filter bank multi-carrier (FBMC)) is applied. In an embodiment, the multiple transmission paths 306-1 to 306-N may provide an independent signal-processing process with respect to multiple streams generated through the digital beamforming. In an embodiment, according to an implementation method, a part of elements of the multiple transmission paths 306-1 to 306-N may be shared.

In an embodiment, the analog beamforming circuit 308 may perform beamforming on an analog signal. In an embodiment, the analog beamforming circuit 308 may perform beamforming by multiplying analog signals by beamforming weights. In an embodiment, the beamforming weights may be used to change the magnitude and the phase of a signal. In an embodiment, according to a connection structure between the multiple transmission paths 306-1 to 306-N and antennas, the analog beamforming circuit 308 may be configured in various ways. In an embodiment, each of the multiple transmission paths 306-1 to 306-N may be connected to one antenna array. In an embodiment, the multiple transmission paths 306-1 to 306-N may be connected to one antenna array. In an embodiment, the multiple transmission paths 306-1 to 306-N may be adaptively connected to one antenna array, or may be connected to two or more antenna arrays.

Figure 4:
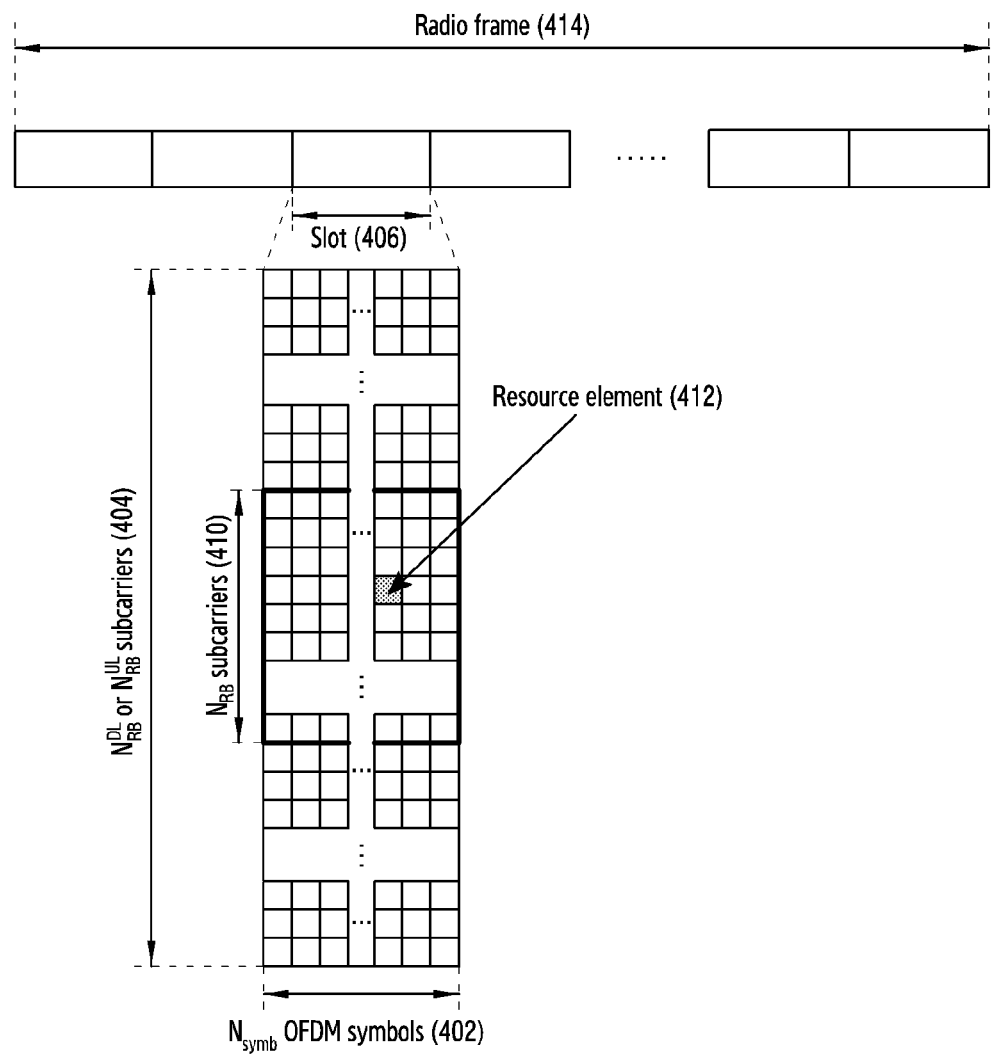
FIG. 4 illustrates a time-frequency domain resource structure in a wireless communication system according to an embodiment of the disclosure.

FIG. 4 illustrates a time-frequency domain resource structure in a wireless communication system according to an embodiment of the disclosure. FIG. 4 illustrates a basic structure of a time-frequency domain that is a wireless resource area in which data or a control channel is transmitted in the downlink.

Referring to FIG. 4, a horizontal axis represents a time domain, and a vertical axis represents a frequency domain. In an embodiment, in the time domain, the minimum transmission unit may be an OFDM symbol. In an embodiment, Nsymb OFDM symbols 402 may constitute one slot 406. In an embodiment, the length of a subframe may be defined as 1 ms. In an embodiment, the length of a radio frame 414 may be defined as 10 ms. In an embodiment, in the frequency domain, the minimum transmission unit may be a subcarrier. In an embodiment, a total of NBW subcarriers 404 may constitute the entire system transmission bandwidth.

In an embodiment, a basic unit of a resource in the time-frequency domain may be a resource element (RE) 412. In an embodiment, the resource element (RE) 412 may be indicated as an OFDM symbol index and a subcarrier index. In an embodiment, in a case of LTE, a resource block (RB or a physical resource block (PRB)) may be defined as Nsymb consecutive OFDM symbols 402 in the time domain, and NRB consecutive subcarriers 410 in the frequency domain. In an embodiment, in a case of LTE, one resource block may include Nsymb×NRB REs 412. In an embodiment, in a case of NR, a resource block (an RB or a PRB) may be defined as NRB consecutive subcarriers 410 in the frequency domain. In an embodiment, in a case of NR, one resource block may be defined by 12 consecutive subcarriers 410. In an embodiment, the minimum transmission unit of data may be an RB. In an embodiment, in the NR system, in a case of a subcarrier spacing of 15 kHz, Nsymb=14 and NRB=12. In an embodiment, in the NR system, NBW may be proportional to a bandwidth of a system transmission band. In an embodiment, a data rate may increase in proportion to the number of RBs which are scheduled to the terminal.

In an embodiment, in the NR system, in a case of a frequency division duplex (FDD) system in which a downlink and an uplink are distinguished by a frequency, a downlink transmission bandwidth and an uplink transmission bandwidth may be different from each other. In an embodiment, a channel bandwidth indicates a radio frequency (RF) bandwidth corresponding to a system transmission bandwidth. In an embodiment, in a case of a subcarrier spacing of 30 kHz, in an NR cell having a 100 megahertz (MHz) channel bandwidth, a transmission bandwidth may include 273 RBs.

In an embodiment, the modulation scheme supported in the NR system may include quadrature phase shift keying (QPSK), 16 quadrature amplitude modulation (QAM), 64 QAM, and 256 QAM. In an embodiment, modulation orders (Qm) of the modulation scheme may correspond to 2, 4, 6, and 8, respectively. In an embodiment, in a case of QPSK, two bits per symbol may be transmitted. In an embodiment, in a case of 16 QAM, four bits per symbol may be transmitted. In an embodiment, in a case of 64 QAM, six bits per symbol may be transmitted. In an embodiment, in a case of 256 QAM, eight bits per symbol may be transmitted.

Figure 5:
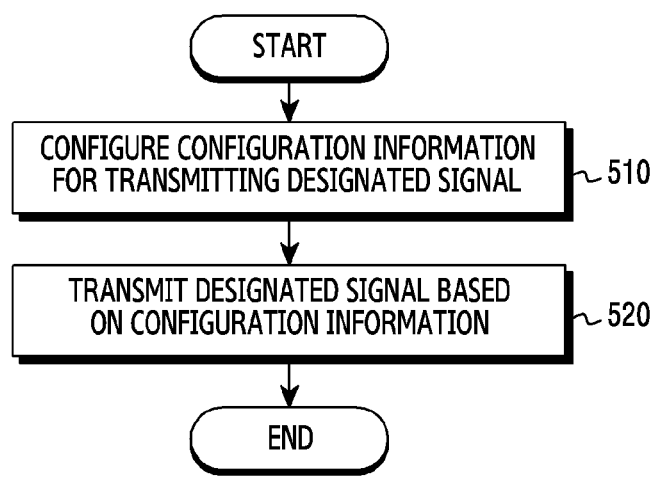
FIG. 5 is a flow chart illustrating transmission of a test signal by a base station according to an embodiment of the disclosure.

FIG. 5 is a flow chart illustrating transmission of a test signal by a base station according to an embodiment of the disclosure. Operations of FIG. 5 may be performed by the base station 110.

Referring to FIG. 5, in operation 510, the base station 110 may configure configuration information. In an embodiment, the base station 110 may configure configuration information for transmitting a designated signal.

In an embodiment, the configuration information of the base station 110 may be information for configuring a modulation scheme of the test signal. In an embodiment, the modulation scheme of the test signal may be one of QPSK, 16 QAM, 64 QAM, and 256 QAM. In an embodiment, the modulation scheme of the test signal may be QPSK in a case of a physical downlink control channel (PDCCH). In an embodiment, the modulation scheme of the test signal may be QPSK in a case of a physical downlink shared channel (PDSCH).

In an embodiment, the configuration information of the base station 110 may be information for configuring a channel (e.g., a PDCCH, a PDSCH, a physical hybrid automatic repeat request (HARQ) indicator channel (PHICH), a physical control format indicator channel (PCFICH), or a physical broadcast channel (PBCH)) related to the test signal.

In an embodiment, the configuration information of the base station 110 may be information for configuring a signal (e.g., a cell-specific reference signal (CRS), a demodulation reference signal (DM-RS), a primary synchronization signal (PSS), or a secondary synchronization signal (SSS)) related to the test signal.

In an embodiment, the configuration information of the base station 110 may be information for configuring the position (e.g., a symbol index and/or a subcarrier index) of a resource occupied by the test signal.

In an embodiment, the configuration information of the base station 110 may be information for configuring information (e.g., a cell identifier (ID) or a radio network temporary identifier (RNTI)) used for scrambling of the test signal.

In an embodiment, the configuration information of the base station 110 may be information for designating a multimedia broadcast single frequency network (MBSFN) subframe.

In an embodiment, the configuration information of the base station 110 may be information for configuring an MBSFN subframe and a subframe other than the MBSFN subframe.

Referring to FIG. 5, in operation 520, the base station 110 may transmit a designated signal based on the configuration information.

In an embodiment, the terminal 120 and the terminal 130 may receive a test signal of the base station 110. In an embodiment, the terminal 120 and the terminal 130 may output a measurement value of the test signal of the base station 110 by using an output device (e.g., a display).

Figure 6:
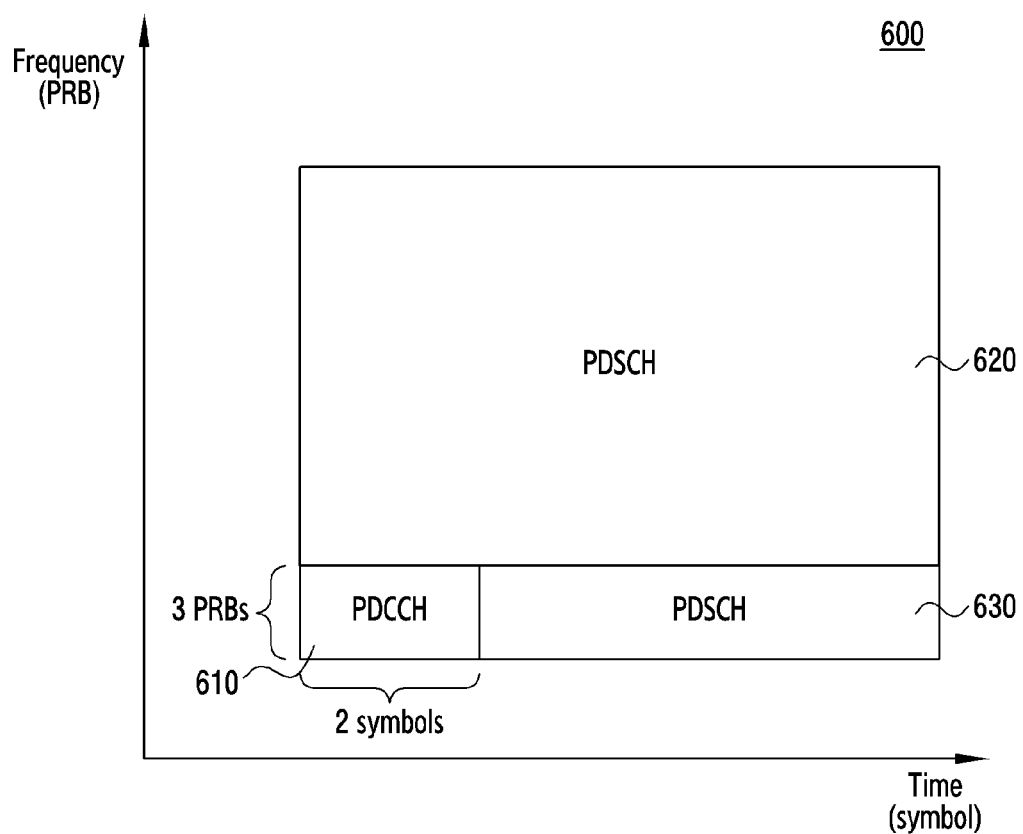
FIG. 6 illustrates a slot structure of a test signal transmitted by a base station according to an embodiment of the disclosure.

FIG. 6 illustrates a slot structure of a test signal transmitted by the base station 110 according to an embodiment of the disclosure.

Referring to FIG. 6, a test signal 600 may include a PDCCH 610 and PDSCHs 620 and 630. In an embodiment, the test signal 600 may include resource blocks (RBs or PRBs) corresponding to a channel bandwidth of the base station 110. In an embodiment, when a channel bandwidth of an NR cell of the base station 110 is 10 MHz, the number of PRBs included in the test signal 600 may be 52.

In an embodiment, the PDCCH 610 may be transmitted in a designated area of the test signal 600. In an embodiment, an area for the PDCCH 610 may include three resource blocks (i.e., 36 subcarriers) in the frequency axis. In an embodiment, an area for the PDCCH 610 may include two symbols in the time axis. In an embodiment, the PDCCH 610 may be transmitted in an area divided into resource blocks 0 to 2 and symbols 0 and 1. In an embodiment, the number of resource elements included in the area for the PDCCH 610 is 72 (resource elements in which a subcarrier index of each of three resource blocks is one of 0 to 11, and a symbol index is 0 or 1).

In an embodiment, one control channel element (CCE) may be allocated to the PDCCH 610. In an embodiment, an aggregation level may be 1. In an embodiment, the CCE may be a set of resources which can be used to transmit the PDCCH 610. In an embodiment, the CCE may include six resource element groups (REGs). In an embodiment, the REG may include 12 resource elements.

In an embodiment, a DM-RS may be also transmitted in the area for the PDCCH 610. In an embodiment, the DM-RS transmitted in the area for the PDCCH 610 may be referred to as a "first DM-RS".

In an embodiment, the first DM-RS may be used to demodulate a control signal transmitted through the PDCCH 610. In an embodiment, the first DM-RS may be transmitted through a resource element identified by a designated subcarrier index in each of PRBs allocated in the area for the PDCCH 610. In an embodiment, the designated subcarrier index for transmitting the first DM-RS may be 1, 5, or 9. In an embodiment, the first DM-RS may be transmitted through 18 resource elements (resource elements in which a subcarrier index of each of three resource blocks is 1, 5, or 9, and a symbol index is 0 or 1) among resource elements in the allocated area of the PDCCH 610.

In an embodiment, the first DM-RS may be scrambled by using a designated identifier. In an embodiment, the designated identifier for the scrambling of the first DM-RS may be identical to a cell ID of the base station 110.

In an embodiment, a control signal transmitted through the PDCCH 610 may be transmitted through 54 resource elements remaining after excluding 18 resource elements for the first DM-RS among 72 resource elements. In an embodiment, the control signal transmitted through the PDCCH 610 may include as many bits as a value obtained by multiplying 54 resource elements by a modulation order. In an embodiment, in case that the control signal transmitted through the PDCCH 610 is modulated using QPSK, the control signal transmitted through the PDCCH 610 may include 104 bits. In an embodiment, all of the bits of the control signal transmitted through the PDCCH 610 may have a value of 0.

In an embodiment, the control signal transmitted through the PDCCH 610 may be scrambled using a designated identifier. In an embodiment, the designated identifier for the scrambling of the control signal may be identical to a cell ID of the base station 110. In an embodiment, an RNTI value used for the scrambling of the control signal may be 0.

In an embodiment, the PDSCH 620 may include as many resource blocks as a value obtained by subtracting three from the number of resource blocks corresponding to the channel bandwidth of the base station 110. In an embodiment, in case that the channel bandwidth of the base station 110 is 10 MHz, the PDSCH 620 may include 49 (a value obtained by subtracting 3 from 52) PRBs. In an embodiment, the PDSCH 620 may include Nsymb (e.g., 14) symbols in the time axis. In an embodiment, a data signal transmitted through the PDSCH 620 may be transmitted in PRBs 3 to NBW-1 and symbols 0 and Nsymb-1. In an embodiment, NBW may be the number of resource blocks corresponding to the channel bandwidth of the base station 110. In an embodiment, Nsymb may be the number (e.g., 14) of symbols included in a slot.

In an embodiment, the PDSCH 630 may include three resource blocks in the frequency axis. In an embodiment, the PDSCH 630 may include Nsymb-2 symbols in the time axis. In an embodiment, the data signal transmitted through the PDSCH 630 may be transmitted in resource blocks 0 to 2 and symbols 2 and Nsymb-1.

In an embodiment, the data signals transmitted through the PDSCHs 620 and 630 may be modulated using a designated modulation scheme. In an embodiment, the data signals transmitted through the PDSCHs 620 and 630 may be modulated using 16 QAM. In an embodiment, all the bits of the data signals transmitted through the PDSCHs 620 and 630 may have a value of 0.

In an embodiment, the data signals transmitted through the PDSCHs 620 and 630 may be scrambled using a designated identifier. In an embodiment, the designated identifier for scrambling of the data signals transmitted through the PDSCHs 620 and 630 may be identical to a cell ID of the base station 110. In an embodiment, an RNTI value used for the scrambling of the data signal transmitted through the PDSCH 620 may be may be 0. In an embodiment, an RNTI value used for the scrambling of the data signal transmitted through the PDSCH 630 may be may be 2.

In an embodiment, a DM-RS may be also transmitted in an area for the PDSCHs 620 and 630. In an embodiment, the DM-RS transmitted in the area for the PDSCHs 620 and 630 may be referred to as a "second DM-RS".

In an embodiment, the second DM-RS may be used to demodulate the data signals transmitted through the PDSCHs 620 and 630. In an embodiment, the second DM-RS may be transmitted through a resource element (e.g., the third, the 11th, and/or the 12th symbol) identified by a designated mapping type (e.g., mapping type A). In an embodiment, the second DM-RS may be transmitted through the third symbol. In an embodiment, in case that the test signal 600 is transmitted in a first frequency area (e.g., frequency range 1 (FR1)), the second DM-RS may be transmitted through the third symbol. In an embodiment, in case that the test signal 600 is transmitted in a second frequency area (e.g., frequency range 2 (FR2)), the second DM-RS may be transmitted through the 11th or the 12th symbol together with the third symbol. In an embodiment, the second DM-RS may be transmitted through a designated antenna port (e.g., an antenna port 1000). In an embodiment, the first frequency area may be a frequency area corresponding to 410 to 7,125 MHz. In an embodiment, the second frequency area may be a frequency area corresponding to 24,250 to 52,600 MHz.

In an embodiment, the second DM-RS may be scrambled using a designated identifier. In an embodiment, the designated identifier for scrambling of the second DM-RS may be identical to a cell ID of the base station 110.

In an embodiment, a phase tracking reference signal (PT-RS) may be included in an area for the PDSCHs 620 and 630. In an embodiment, the PT-RS may be used to identify changes in the phases of the data signals transmitted through the PDSCHs 620 and 630. In an embodiment, a time interval (LPT-RS) of the PT-RS may be 4. In an embodiment, a frequency interval (KPT-RS) of the PT-RS may be 2. In an embodiment, a parameter ($k_{ref}^{RE}$) for the position of a resource element in which the PT-RS is transmitted may be 0. In an embodiment, whether to transmit the PT-RS may be determined according to the frequency area in which the test signal 600 is transmitted. In an embodiment, in case that the test signal 600 is transmitted in the first frequency area (e.g., FR1), the PT-RS may not be transmitted. In an embodiment, in case that the test signal 600 is transmitted in the second frequency area (e.g., FR2), the PT-RS may be transmitted.

Figure 7A:
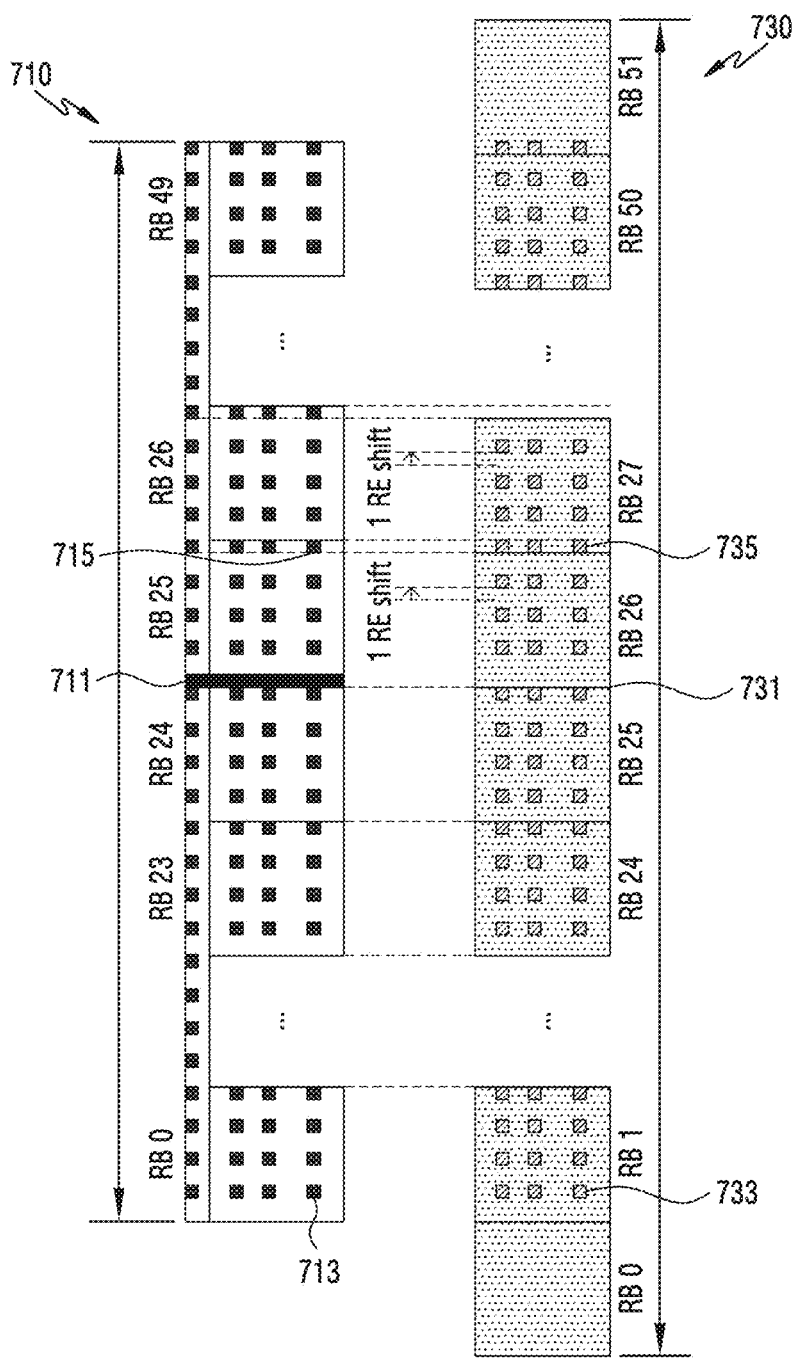
FIG. 7A illustrates a resource structure of a time-frequency area in a dynamic spectrum sharing (DSS) environment according to an embodiment of the disclosure.

FIG. 7A illustrates a resource structure of the time-frequency area in a dynamic spectrum sharing (DSS) environment according to an embodiment of the disclosure.

In an embodiment, the base station 110 may transmit a test signal in a DSS environment. In an embodiment, the base station 110 may transmit a test signal of a designated radio access technology (RAT) in the DSS environment. In an embodiment, the base station 110 may transmit the NR and/or the LTE test signal.

In an embodiment, the base station 110 may transmit different RAT test signals in a designated channel band in the DSS environment. In an embodiment, different RAT channel bands may correspond to one another. In an embodiment, different RAT channel bandwidths (e.g., 10 MHz) may be identical to one another. In an embodiment, even though the same channel bandwidth is allocated to different RATs, the transmission bandwidths of the different RATs may be different from one another. In an embodiment, even though the same channel bandwidth is allocated to different RATs, the number of resource blocks having different RATs may be different from one another.

In an embodiment, a transmission bandwidth 710 for the LTE test signal and a transmission bandwidth 730 for the NR test signal may be included in the same channel bandwidth (e.g., 10 MHz).

Referring to FIG. 7A, the transmission bandwidth 710 and the transmission bandwidth 730 may be different from each other. Referring to FIG. 7A, the number of resource blocks (RB 0 to RB 49) included in the transmission bandwidth 710 may be 50, and the number of resource blocks (RB 0 to RB 51) included in the transmission bandwidth 730 may be 52.

In an embodiment, each of the resource blocks (RB 0 to RB 49) of the transmission bandwidth 710 may have a 15 kHz spacing from a neighboring resource block. In an embodiment, each of the resource blocks (RB 0 to RB 52) of the transmission bandwidth 730 may have a designated spacing (e.g., 15, 30, or 60 kHz) from a neighboring resource block. Referring to FIG. 7A, a spacing of each of the resource blocks (RB 0 to RB 49) of the transmission bandwidth 710 may be identical (e.g., a 15 kHz spacing) to a spacing of each of the resource blocks (RB 0 to RB 52) of the transmission bandwidth 730.

In an embodiment, the base station 110 may transmit a designated LTE signal in designated resource elements 713 and 715. In an embodiment, the designated LTE signal may be a CRS. In an embodiment, the designated LTE signal may be a signal according to a PSS, a SSS, a PDCCH, a PHICH, a PCFICH, or a PBCH. In FIG. 7A, the designated resource elements 713 and 715 are illustrated as only some of resource elements of some resource blocks (RB0 and RB 25), which is merely for clearly representing the drawing. In an embodiment, resource elements for transmitting the designated LTE signals may exist in LTE resource blocks (RB 0 to RB 49).

In an embodiment, the base station 110 may transmit no NR test signal in NR resource elements 733 and 735 corresponding to resource elements 713 and 715 in which the designated LTE signals are transmitted, respectively. In an embodiment, as the designated LTE signals are transmitted in the designated resource elements of the LTE resource blocks (RB 0 to RB 49), no NR test signal may be transmitted in resource elements of the NR resource blocks (RB1 to RB 51) corresponding to resource elements in which the designated LTE signals are transmitted, respectively.

In an embodiment, the base station 110 may transmit no LTE test signal in the central frequency 711 of the LTE channel bandwidth (e.g., 10 MHz).

In an embodiment, as no LTE test signal is transmitted in the central frequency 711, a subcarrier index of a resource element in which no NR test signal is transmitted, the resource element being positioned after the frequency 731 corresponding to the central frequency 711, may be different from a subcarrier index of a resource element in which no NR test signal is transmitted, the resource element being positioned before the frequency 731. In an embodiment, the subcarrier index of a resource element in which no test signal is transmitted, the resource element being positioned after the frequency 731, may move by 1 along the frequency axis. In an embodiment, the subcarrier index of a resource element in which no NR test signal is transmitted, the resource element being positioned after the frequency 731, may increase by 1 compared by the subcarrier index of a resource element in which no NR test signal is transmitted, the resource element being positioned before the frequency 731.

Figure 7B:
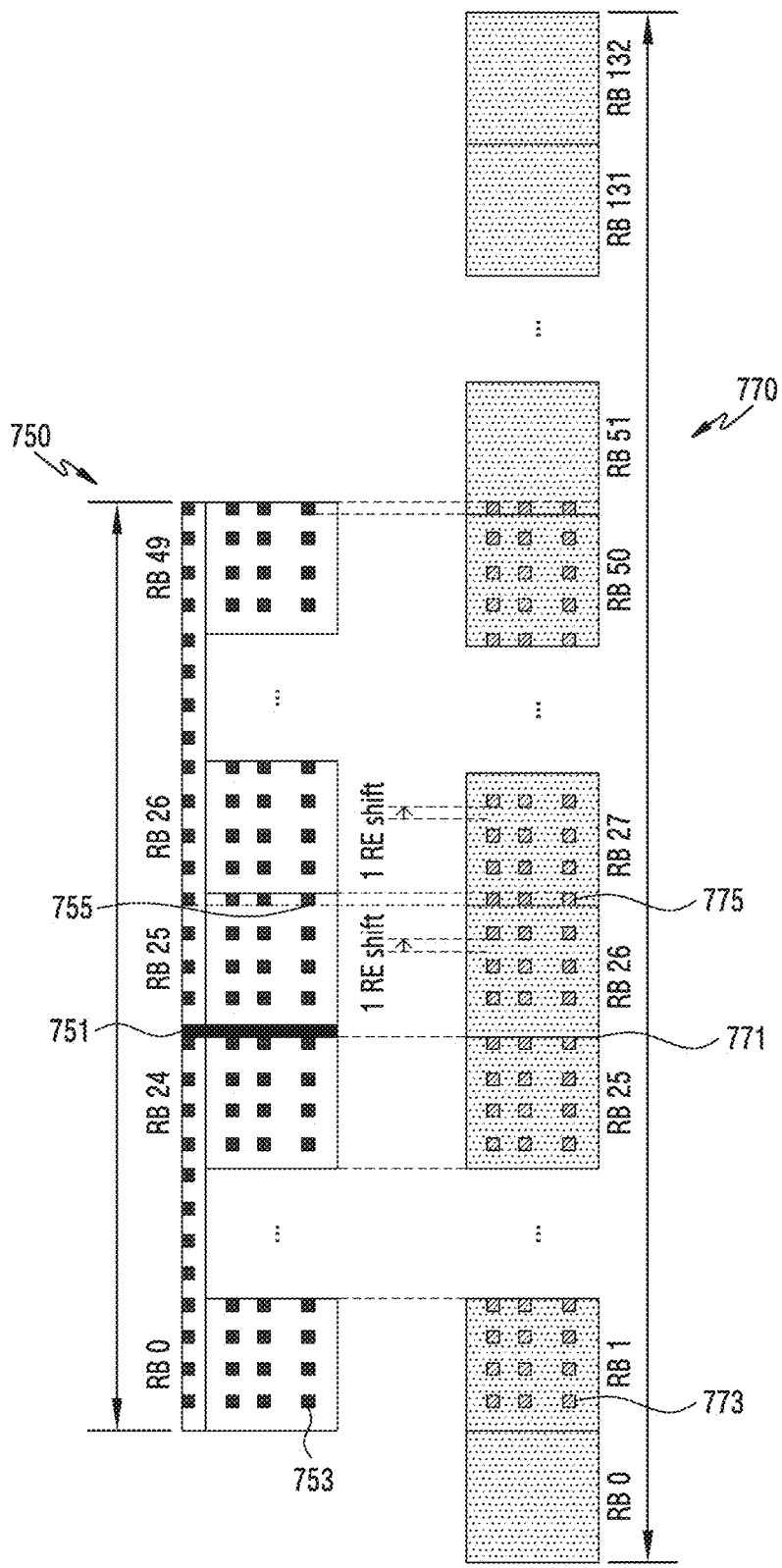
FIG. 7B illustrates a resource structure of a time-frequency area in a DSS environment according to an embodiment of the disclosure.

FIG. 7B illustrates a resource structure of the time-frequency area in a DSS environment according to an embodiment of the disclosure.

Compared to FIG. 7A, FIG. 7B illustrates a situation in which the channel bandwidth (e.g., 25 MHz) for the NR test signal is wider than the channel bandwidth (e.g., 10 MHz) for the LTE test signal.

Referring to FIG. 7B, in an embodiment, resource blocks (RB 0 to RB 49) included in a transmission bandwidth 750 may be 50, and resource blocks (RB 0 to RB 132) included in a transmission bandwidth 770 may be 133. In an embodiment, each of resource blocks (RB 0 to RB 49) of the transmission bandwidth 750 may have a 15 kHz spacing from a neighboring block. In an embodiment, each of resource blocks (RB 0 to RB 132) of the transmission bandwidth 770 may have a designated spacing (e.g., 15, 30, or 60 kHz) from a neighboring resource block. Referring to FIG. 7B, each of resource blocks (RB 0 to RB 49) of the transmission bandwidth 750 may be identical to a spacing (e.g., a spacing of 15 kHz) from each of the resource blocks (RB 0 to RB 132) of the transmission bandwidth 770.

In an embodiment, the base station 110 may transmit the designated LTE signal in designated resource elements 753 and 755. In an embodiment, the base station 110 may not transmit the NR test signal in NR resource elements 773 and 775 corresponding to resource elements 753 and 755 in which the designated LTE signal is transmitted, respectively. Referring to FIG. 7B, the designated resource elements 753 and 755 are illustrated as only some of resource elements of some resource blocks (RB0 and RB 25), which is merely for clearly representing the drawing. In an embodiment, resource elements for transmitting the designated LTE signals may exist in LTE resource blocks (RB 0 to RB 49). In an embodiment, as the designated LTE signals are transmitted in the designated resource elements of the LTE resource blocks (RB 0 to RB 49), no NR test signal may be transmitted in resource elements of the NR resource blocks (RB1 to RB 51) corresponding to resource elements in which the designated LTE signals are transmitted, respectively.

In an embodiment, as no LTE test signal is transmitted in the central frequency 751, a subcarrier index of a resource element in which no NR test signal is transmitted, the resource element being positioned after a frequency 771 corresponding to the central frequency 751, may be different from a subcarrier index of a resource element in which no NR test signal is transmitted, the resource element being positioned before the frequency 771.

Referring to FIG. 7B, it is illustrated that a transmission band according to the transmission bandwidth 750 for the LTE test signal is included in a transmission band according to the transmission bandwidth 770 for the NR test signal, but it is a mere example. In an embodiment, the transmission band for the LTE test signal and the transmission band for the NR test signal may overlap in some frequency bands only.

In an embodiment, when a test signal is transmitted in a second transmission band of an NR-based cell, the second transmission band at least partially overlapping an LTE cell-based first transmission band, the test signal may be transmitted in first resource elements among resource elements included in a first resource block of the second transmission band. In an embodiment, the subcarrier of the first resource block may overlap those of resource blocks of the first transmission band, among resource blocks of the second transmission band. In an embodiment, second resource elements other than the first resource elements among resource elements included in the first resource block may be occupied by an LTE signal (e.g., a CRS and a PDCCH).

Figure 8:
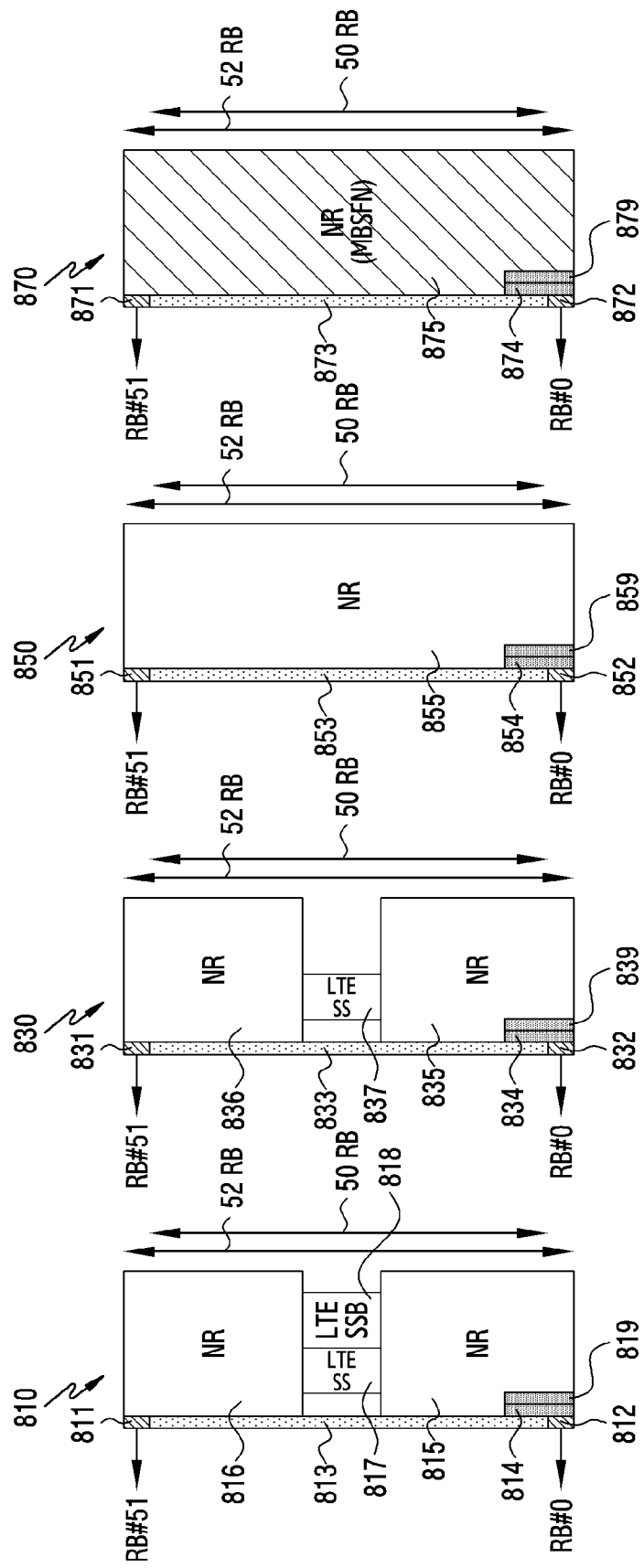
FIG. 8 illustrates structures of subframes for an NR test signal in a DSS environment according to an embodiment of the disclosure.

FIG. 8 illustrates structures of subframes 810, 830, 850, and 870 occupied by an NR test signal transmitted by a base station in a DSS environment according to an embodiment of the disclosure. FIG. 8 illustrates structures of subframes 810, 830, 850, and 870 in an environment in which a frequency band for an LTE test signal corresponds to a frequency band for the NR test signal. In an embodiment, in case that the frequency spacing is 15 kHz, the subframes 810, 830, 850, and 870 may be included in one slot.

In an embodiment, the first subframe of a radio frame (e.g., the radio frame 414 of FIG. 4) may have a structure of the subframe 810. In an embodiment, the fifth subframe of the radio frame may have a structure of the subframe 830. In an embodiment, subframes other than the first and the fifth subframe of the radio frame may have a structure of the subframe 850. In an embodiment, designated subframes (e.g., multimedia broadcast single frequency network (MBSFN) subframe) among multiple subframes of the radio frame may have the structure of the subframe 870. In an embodiment, in a case of frequency division duplex (FDD), the designated subframes may be at least one of the second, the third, the fourth, the seventh, the eighth, and the ninth subframe. In an embodiment, in a case of a time division duplex (TDD), the designated subframes may be at least one of the fourth, the fifth, the eighth, the ninth, and the tenth subframe.

Referring to FIG. 8, the NR test signal may not be transmitted in resource elements 811, 812, 831, 832, 851, 852, 871, and 872 in the same symbol position as that of the element resource (e.g., a resource element positioned in the first symbol of subframes 810, 830, 850, and 870) in which the designated LTE signal (e.g., a PDCCH, a PHICH, and a PCFICH of LTE) is transmitted.

Referring to FIG. 8, the NR test signal may not be transmitted in resource elements 813, 833, 853, and 873 in which the designated LTE signal (e.g., a PDCCH, a PHICH, and a PCFICH of LTE) is transmitted.

Referring to FIG. 8, the NR test signal may not be transmitted in resource blocks (e.g., six resource blocks) occupied by resource elements 817, 818, and 837 in which the designated LTE signal (e.g., a PSS, a SSS, or a PBCH of LTE) is transmitted. In FIG. 8, resource elements 817 and 837 displaying an LTE synchronization signal (SS) may indicate resource elements in which the LTE synchronization signal (the PSS or the SSS) is transmitted. In FIG. 8, a resource element 818 displaying an LTE synchronization signal block may indicate a resource element in which the LTE PBCH is transmitted.

Referring to FIG. 8, a PDCCH of the NR test signal may be transmitted in the resource elements 814, 819, 834, 839, 854, 859, 874, and 879 at the designated position of the subframes 810, 830, 850, and 870. In an embodiment, each of the resource elements 814, 819, 834, 839, 854, 859, 874, and 879 may have a symbol index of 1 or 2. In an embodiment, each of the resource elements 814, 819, 834, 839, 854, 859, 874, and 879 may have a resource block index of 1, 2, or 3. In an embodiment, a DM-RS and a control signal of the PDCCH may be transmitted in the resource elements 814, 819, 834, 839, 854, 859, 874, and 879.

In an embodiment, a DM-RS and a data signal of the PDSCH may be transmitted in the resource elements 815, 816, 835, 836, 855, and 875 for the PDSCH among the NR test signal. In an embodiment, in subframes 810, 830, and 850 other than the MBSFN subframe 870, some resource elements of the resource elements 815, 816, 835, 836, and 855 may be used to transmit the designated LTE signal (e.g., the LTE CRS). In an embodiment, in the MBSFN subframe 870, all of the resource elements 875 may be used to transmit the NR test signal. In an embodiment, in the resource elements 875 of the MBSFN subframe 870, the designated LTE signal (e.g., the LTE CRS) may not be transmitted.

Figure 9:
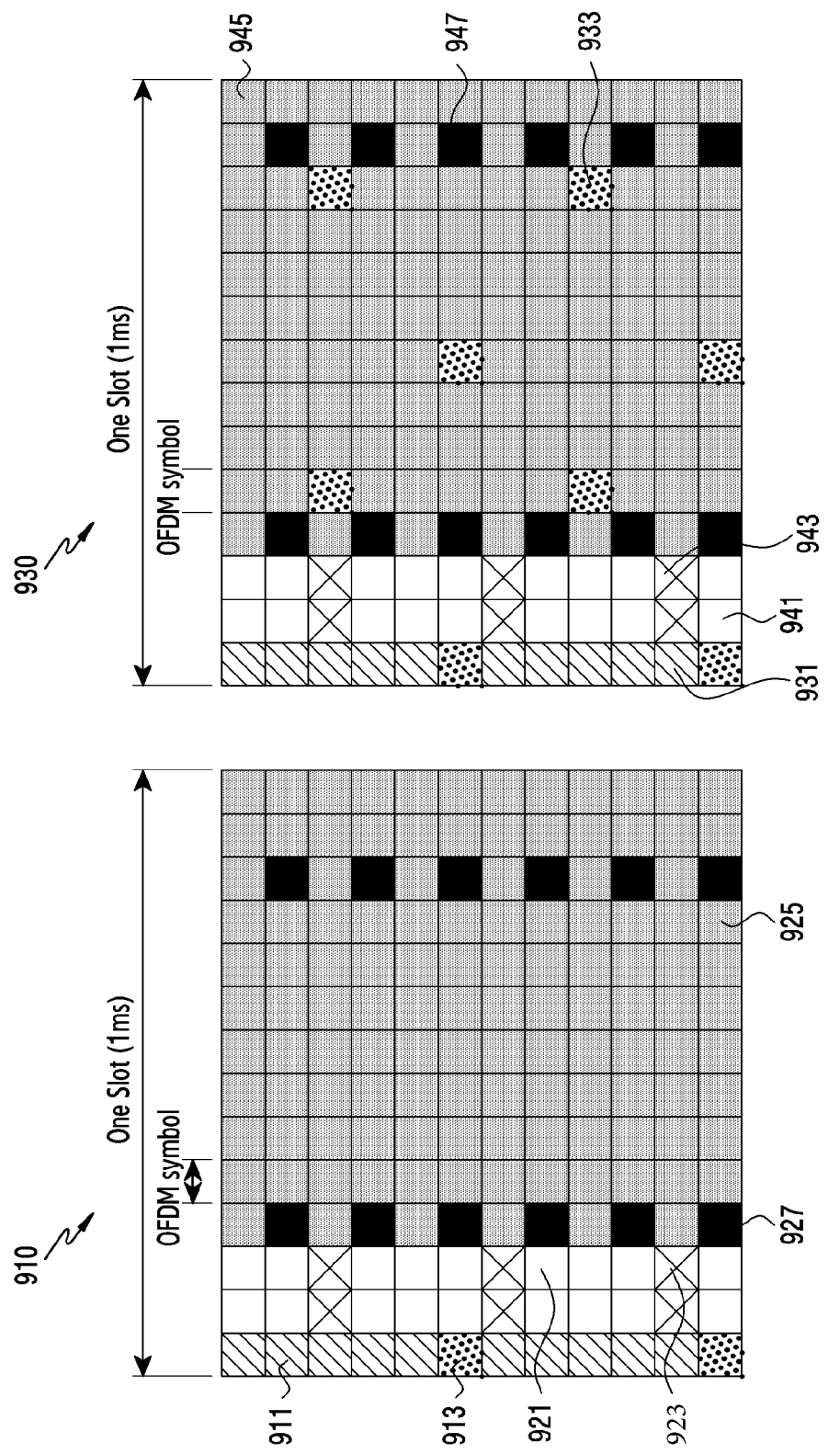
FIG. 9 illustrates a resource structure of a time-frequency area in a DSS environment according to an embodiment of the disclosure.

FIG. 9 illustrates a resource structure of the time-frequency area in a DSS environment according to an embodiment of the disclosure. In an embodiment, FIG. 9 illustrates a test signal transmitted in a slot (or a subframe in a case of a 15 kHz frequency spacing) of a resource block. Referring to FIG. 9, squares having the same type signals having the same type.

Referring to FIG. 9, a test signal 910 transmitted in a designated subframe (e.g., an MBSFN subframe) of a radio frame is illustrated. Referring to FIG. 9, a test signal 930 transmitted in subframes other than the first and the fifth subframe of the radio frame is illustrated.

In an embodiment, in a resource element in which the symbol index of the test signal 910 or 930 is 0, a PDCCH 911 or 931 and a CRS 913 or 933 of LTE may be transmitted. In an embodiment, in a resource element in which the symbol index of the test signal 910 or 930 is 0 and a subcarrier index is 0 or 6, a CRS 913 or 933 may be transmitted.

In an embodiment, in a resource element in which the symbol index of the test signal 910 or 930 is 1 or 2, a PDCCH 921 or 941 and a DM-RS 923 or 943 of NR may be transmitted. In an embodiment, in a resource element in which the symbol index of the test signal 910 or 930 is 1 or 2 and a subcarrier index is 1, 5, or 9, a DM-RS 923 or 943 may be transmitted.

In an embodiment, in resource elements in which the symbol index of the test signal 910 or 930 is 3 to 13, a PDSCH 925 or 945 of NR may be transmitted.

In an embodiment, in resource elements in which the symbol index of the test signal 910 is 3 to 13, a CRS of LTE may be not included. In an embodiment, in resource elements in which the symbol index of the test signal 930 is 4, 7, or 11, a CRS of LTE may be included.

In an embodiment, in resource elements in which the symbol index is 3 to 13, a DM-RS 927 or 947 may be transmitted. In an embodiment, in resource elements in which the symbol index is 3, a DM-RS of NR may be transmitted. In an embodiment, in a resource element in which the symbol index is 3 and the subcarrier index is 0, 2, 4, 8, 10, or 12, a DM-RS may be transmitted.

In an embodiment, in a resource element in which the symbol index of the test signal 910 is 11, a DM-RS of NR may be transmitted. In an embodiment, in a resource element in which the symbol index of the test signal 910 is 11 and the subcarrier index is 0, 2, 4, 8, 10, or 12, a DM-RS may be transmitted.

In an embodiment, in resource elements in which the symbol index of the test signal 930 is 4 or 11 and the subcarrier index is 3 or 9, a CRS of LTE may be transmitted. In an embodiment, in resource elements in which the symbol index of the test signal 930 is 7 and the subcarrier index is 0 or 6, a CRS of LTE may be transmitted.

In an embodiment, in resource elements in which the symbol index of the test signal 930 is 12, a DM-RS of NR may be transmitted. In an embodiment, in a resource element in which the symbol index of the test signal 930 is 12 and the subcarrier index is 0, 2, 4, 8, 10, or 12, a DM-RS may be transmitted.

In an embodiment, configuration information for transmitting the test signal 910 is shown in Table 1 below.

TABLE 1

- Starting symbol number for control channel = 1
    - Dmrs-TypeA-Position for the first DMRS symbol = 'pos3'
- Dmrs-AdditionalPosition symbol $l_1$ = 11
- For PDSCH $n_{RNTI}$ = 0 or $n_{RNTI}$ = 1, starting symbol number = 1
- For PDSCH $n_{RNTI}$ = 2, starting symbol number = 3
- RateMatchPatternLTE-CRS
    - carrierFreqDL = $N_{RB}$ × 6
    - carrierBandwidthDL = one of {1.4, 3, 5, 10, 15, 20MHz}
    - nrofCRS-Ports = 1
    - v-Shift = 1
    - mbsfn-SubframeConfigList
        ∨ radioframeAllocationPeriod = 1
        ∨ radioframeAllocationOffset = 0
        ∨ subframeAllocation1 = oneFrame (size-6 bitmap)
            • For FDD, slot #6 is MBSFN subframe = [0 0 0 1 0 0]
            • For TDD, slot #9 is MBSFN subframe = [0 0 0 0 0 1]

Referring to Table 1, the stating symbol position of the control channel (starting symbol number of the control channel) may be 1. Referring to Table 1, the position of the symbol in which the first DM-Rs signal is transmitted (Dmrs-TypeA-Position for the first DMRS symbol) may be "pos3". In an embodiment, "pos3" may indicate that the index of the symbol in which the DM-RS signal is transmitted is 3. In an embodiment, the DM-RS signal may be configured to be PDSCH Mapping Type A.

Referring to Table 1, the index of the symbol in which an additional DM-RS signal is transmitted (Dmrs-AdditionalPosition symbol) may be 11.

Referring to Table 1, the index of the starting symbol of the PDSCH having the RNTI of 0 or 1 may be 1. Referring to Table 1, the index of the starting symbol of the PDSCH having the RNTI of 2 may be 3.

Referring to Table 1, the RateMatchPatternLTE-CRS may be configured for the test signal 910. Referring to Table 1, a detailed item for configuring the RateMatchPatternLTE-CRS may include an item for configuring a downlink subcarrier (carrierFreqDL), a downlink bandwidth (carrierBandwidthDL), the number of CRS ports (nrofCRS-Ports), v-Shift, or an MBSFN subframe configuration list (mbsfn-SubframeConfigList). Referring to Table 1, a detailed item for configuring the MBSFN subframe configuration list (mbsfn-SubframeConfigList) may include an item for configuring a radio frame allocation period (radioframeAllocationPeriod), a radio frame allocation offset (radi oframeAlloc ati onOffs et), or sub frame allocation (subframeAllocation1).

Referring to Table 1, the downlink subcarrier (carrierFreqDL) may be a frequency corresponding to six resource blocks. In an embodiment, the six resource blocks may include 72 subcarriers. Referring to Table 1, the downlink bandwidth (carrierBandwidthDL) may be an LTE channel bandwidth, and may be one of 1.4, 3, 5, 10, 15, or 20 MHz. Referring to Table 1, the number of CRS ports (nrofCRS-Ports) may correspond to the number of antenna ports through which the CRSs are transmitted, and may be 1. Referring to Table 1, the v-Shift may be 1. In an embodiment, the v-Shift may be the position in the frequency area for different reference signals (e.g., CRSs).

In an embodiment, the MBSFN subframe configuration list (mbsfn-SubframeConfigList) may be a configuration for determine the position of the MBSFN subframe. In an embodiment, the radio frame allocation period (radioframeAllocationPeriod) may be a configuration for indicating a radio frame including the MBSFN subframe. Referring to Table 1, the radio frame allocation period may be 1. In an embodiment, a value obtained by dividing a system frame number (SFN) of the radio frame by the radio frame allocation period is identical to the value of the radio frame allocation offset (radioframeAllocationOffset), the MBSFN subframe may be included in the corresponding radio frame. Referring to Table 1, the radio frame allocation offset may be 0. Referring to Table 1, the radio frame allocation period is 1 and the radio frame allocation offset is 0, and thus the MBSFN subframe may be included in all of the radio frames.

In an embodiment, the subframe allocation (subframeAllocation1) may indicate the number of MBSFN subframes included in the radio frame. Referring to Table 1, in a case of FDD, in case that the subframe allocation indicates [0 0 0 1 0 0], a subframe having the index of 6 may be the MBSFN subframe. Referring to Table 1, in a case of TDD, in case that the subframe allocation indicates [0 0 0 0 0 1], a subframe having the index of 9 may be the MBSFN subframe.

In an embodiment, configuration information for transmitting the test signal 930 is shown in Table 2 below.

TABLE 2

- Starting symbol number for control channel = 1
- Dmrs-TypeA-Position for the first DMRS symbol = 'pos3'
- Dmrs-AdditionalPosition symbol $l_1$ = 12
- For PDSCH $n_{RNTI}$ = 0 or $n_{RNTI}$ = 1, starting symbol number = 1
- For PDSCH $n_{RNTI}$ = 2, starting symbol number = 3
- RateMatchPatternLTE-CRS
  - carrierFreqDL = $N_{RB}$ × 6
  - carrierBandwidthDL = one of {1.4, 3, 5, 10, 15, 20MHz}
  - nrofCRS-Ports = 1
  - v-Shift = 1
  - mbsfn-SubframeConfigList
    \/ radioframeAllocationPeriod = 1
    \/ radioframeAllocationOffset = 0
    \/ subframeAllocation1 = oneFrame (size-6 bitmap)
      • For FDD, slot #6 is MBSFN subframe = [0 0 0 1 0 0]
      • For TDD, slot #9 is MBSFN subframe = [0 0 0 0 0 1]

Compared to Table 1, for the test signal 930 according to Table 2, the starting symbol position of the control channel, the position of the symbol in which the first DM-RS signal is transmitted, the position of the symbol in which an additional DM-RS signal is transmitted, and the starting position of the PDSCH may change. Referring to Table 2, the position of the symbol in which the first DM-RS signal is transmitted may be "pos3". In an embodiment, "pos3" may indicate that the index of the symbol in which the DM-RS signal is transmitted is 3. Referring to Table 2, the index of the additional DM-RS is transmitted may be 12. Referring to Table 2, the index of the starting symbol of the PDSCH having the RNTI of 0 or 1 may be 1. Referring to Table 2, the index of the starting symbol of the PDSCH having the RNTI of 2 may be 3.

In Table 1 and Table 2, it is illustrated that the MBSFN subframe configuration list (mbsfn-SubframeConfigList) has a designated value, but it is a mere example.

In an embodiment, the radio frame allocation period (radioframeAllocationPeriod) may have a value of 1, 2, 4, 8, 16, or 32.

In an embodiment, the radio frame allocation offset (radioframeAllocationOffset) may be an integer value smaller than the value of the radio frame allocation period (radioframeAllocationPeriod). In an embodiment, the radio frame allocation offset (radioframeAllocationOffset) may be an integer value equal to or smaller than 7. In an embodiment, the radio frame allocation offset (radioframeAllocationOffset) may be have an integer value equal to or larger than 0.

In an embodiment, the subframe allocation (subframeAllocation1) may correspond to one of "oneFrame" or "fourFrames". In an embodiment, the "oneFrame" may be for configuring subframes of the radio frame identified by the radio frame allocation period (radioframeAllocationPeriod) and the radio frame allocation offset (radioframeAllocationOffset). In an embodiment, the "fourFrames" may be for configuring subframes of the radio frame identified by the radio frame allocation period (radioframeAllocationPeriod) and the radio frame allocation offset (radioframeAllocationOffset), and subframes of three consecutive radio frames after the radio frame above.

In an embodiment, in case that the subframe allocation (subframeAllocation1) corresponds to "oneFrame", the subframe allocation (subframeAllocation1) may include six bits. In an embodiment, in a case of FDD, whether each of subframes having the index of 1, 2, 3, 6, 7, or 8 is an MBSFN subframe may be indicated by the six bits of the subframe allocation (subframeAllocation1). In an embodiment, in a case of TDD, whether each of subframes having the index of 3, 4, 7, 8 or 9 is an MBSFN subframe may be indicated by the six bits of the subframe allocation (subframeAllocation1).

In an embodiment, in case that the subframe allocation (subframeAllocation1) corresponds to "fourFrames", the subframe allocation (subframeAllocation1) may include 24 bits. In an embodiment, 24 bits may be divided into four 6-bit groups. In an embodiment, each of four 6-bit groups may indicate whether subframes of the radio frame identified by the radio frame allocation period (radioframeAllocationPeriod) and the radio frame allocation offset (radioframeAllocationOffset), and subframes of three consecutive radio frames after the radio frame above are MBSFN subframes.

Figure 10:
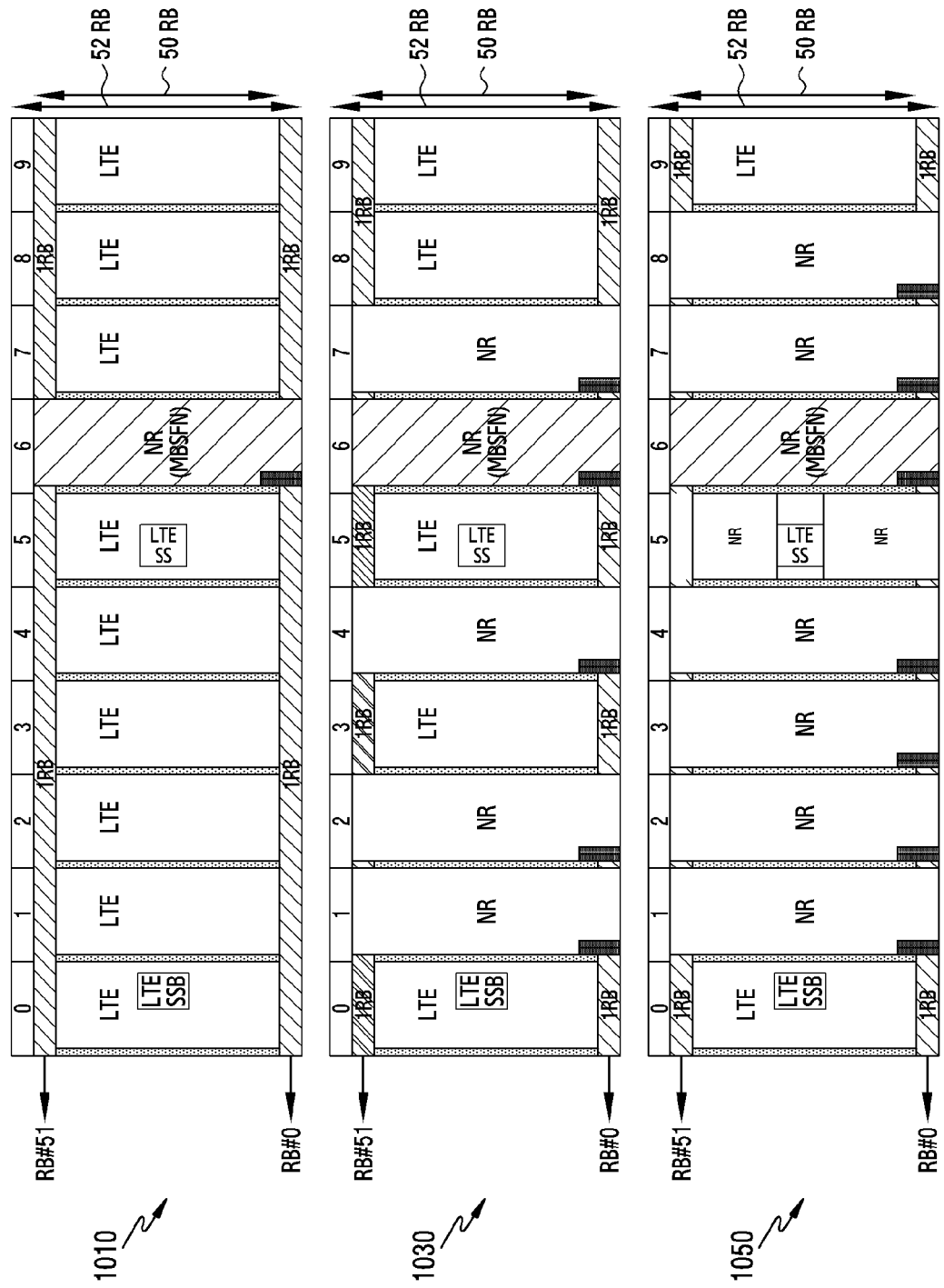
FIG. 10 illustrates a structure of a radio frame for a test signal in a DSS environment according to an embodiment of the disclosure.

FIG. 10 illustrates a structure of a radio frame occupied by a test signal in a DSS environment according to an embodiment of the disclosure.

Referring to FIG. 10, a radio frame 1010 may include one subframe for an NR test signal. Referring to FIG. 10, one subframe for the NR test signal may be a subframe having the index of 6. Referring to FIG. 10, one subframe for the NR test signal may be the subframe 870 of FIG. 8.

Referring to FIG. 10, a radio frame 1030 may include five subframes for the NR test signal. Referring to FIG. 10, five subframes for the NR test signal may have the index of 1, 2, 4, 6, or 7. Referring to FIG. 10, a subframe having the index of 1, 2, 4, or 7, among the five subframes for the NR test signal may be the subframe 850 of FIG. 8. Referring to FIG. 10, a subframe having the index of 6, among the five subframes for the NR test signal may be the subframe 870 of FIG. 8.

Referring to FIG. 10, a radio frame 1050 may include eight subframes for the NR test signal. Referring to FIG. 10, the index of each of the eight subframes for the NR test signal may be one of 1 to 8. Referring to FIG. 10, a subframe having the index of 1 to 4, 7, or 8, among the eight subframes for the NR test signal may be the subframe 850 of FIG. 8. Referring to FIG. 10, a subframe having the index of 6, among the eight subframes for the NR test signal may be the subframe 870 of FIG. 8. Referring to FIG. 10, a subframe having the index of 5, among the eight subframes for the NR test signal may be the subframe 830 of FIG. 8.

Figure 11:
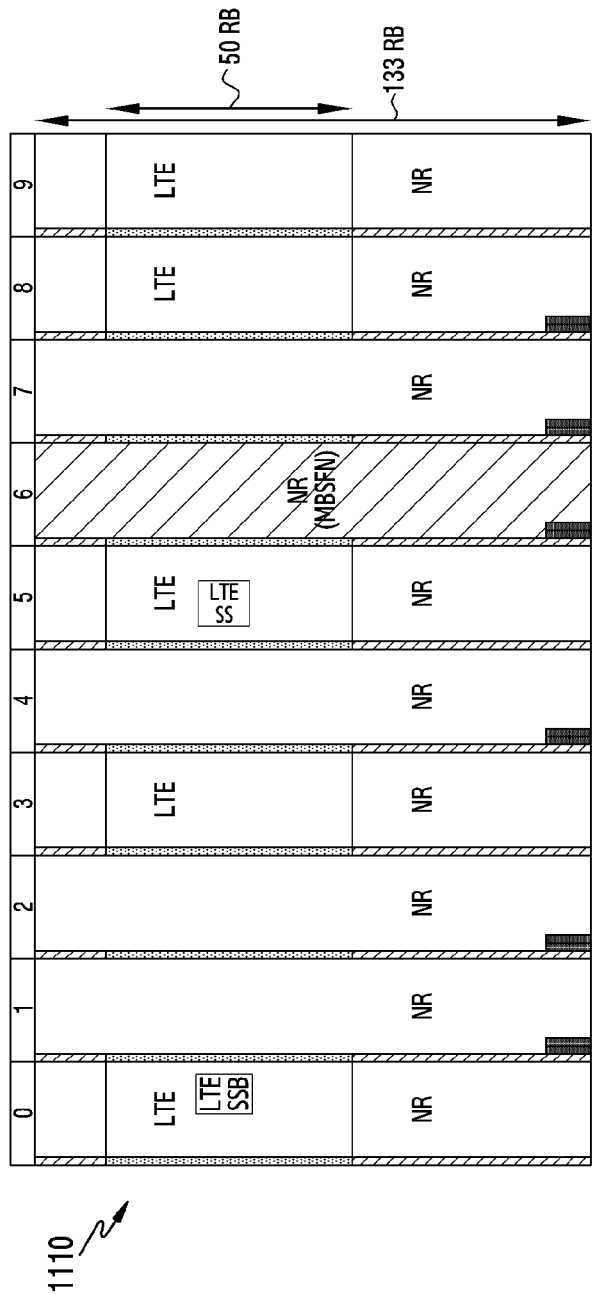
FIG. 11 illustrates a structure of a radio frame for a test signal in a DSS environment according to an embodiment of the disclosure.

FIG. 11 illustrates a structure of a radio frame occupied by a test signal in a DSS environment according to an embodiment of the disclosure.

Compared to FIG. 10, FIG. 11 illustrates a situation in which the channel bandwidth (e.g., 25 MHz) for the NR test signal is wider than the channel bandwidth (e.g., 10 MHz) for the LTE test signal.

Referring to FIG. 11, a NR test signal 1110 may be transmitted in blocks remaining after excluding 50 resource blocks transmitted in which a designated signal (e.g., a PDSCH) of the LTE test signal. Referring to FIG. 11, the NR test signal may also be transmitted in subframes (e.g., a subframe having the index of 0, 3, 5, 8, or 9) in which the LTE PDSCH is transmitted.

In an embodiment, the LTE test signal and the NR test signal may be simultaneously transmitted in one subframe. In an embodiment, when at least a part of a channel band for the NR test signal does not overlap a channel band for the LTE test signal, the LTE test signal and the NR test signal may be simultaneously transmitted in one subframe.

An electronic device according to an embodiment of the disclosure may include: a communication circuit; and a processor; wherein the processor may be configured to: configure configuration information for transmitting a designated test signal in a second transmission band of a new radio (NR)-based cell, the second transmission band at least partially overlapping a first transmission band of a long-term evolution (LTE)-based cell; and transmit the designated test signal based on the configuration information in the second transmission band through the communication circuit, wherein the designated test signal may be transmitted in first resource elements among resource elements included in a first resource block of the second transmission band, a subcarrier of the first resource block may overlap subcarriers of resource blocks of the first transmission band among resource blocks of the second transmission band, and second resource elements other than the first resource elements among the resource elements included in the first resource block may be occupied by a designated signal for LTE.

In an embodiment, resource elements among the first resource elements and each having a symbol index of 3 may be occupied by the DM-RS.

In an embodiment, in case that the designated test signal is transmitted in the MBSFN subframe, resource elements among the first resource elements and each having a symbol index of 11 may be occupied by the DM-RS, and in case that the designated test signal is transmitted in a subframe other than the MBSFN subframe, resource elements among the first resource elements and each having a symbol index of 12 may be occupied by the DM-RS.

In an embodiment, a subcarrier index of each of the resource elements occupied by the DM-RS may be 0, 2, 4, 6, 8, 10, or 12.

In an embodiment, a symbol index of a starting position of a resource element for a PDSCH having an RNTI of 0 or 1, among the first resource elements, is 1.

In an embodiment, a symbol index of a starting position of a resource element for a PDSCH having an RNTI of 2, among the first resource elements, may be 3.

In an embodiment, the MBSFN subframe may exist in each radio frame.

In an embodiment, in a case of frequency division duplex (FDD), the MBSFN subframe is a subframe having an index of at least one of 1, 2, 3, 6, 7, or 8, and in a case of time division duplex (TDD), the MBSFN subframe is a subframe having an index of at least one of 3, 4, 7, 8, or 9.

In an embodiment, the second resource elements may include resource elements, each having a symbol index of 0.

In an embodiment, the second resource elements may be occupied by a cell-specific reference signal (CRS).

In an embodiment, a first signal among the test signal transmitted in the second transmission band of the NR-based cell may be modulated by quadrature phase shift keying (QPSK), and a second signal among the test signal may be modulated by 16 quadrature amplitude modulation (QAM).

In an embodiment, the first signal may be transmitted by a first resource element having a symbol index of 0 or 1 among resource elements included in a resource block having a resource block index of 0, 1, or 2, and the second signal may be transmitted by a second resource element other than the first resource element among resource elements of the second transmission band.

An operation method of an electronic device according to an embodiment of the disclosure may include: configuring configuration information for transmitting a designated test signal in a second transmission band of a new radio (NR)-based cell, the second transmission band at least partially overlapping a first transmission band of a long-term evolution (LTE)-based cell; and transmitting the designated test signal based on the configuration information in the second transmission band, wherein the designated test signal may be transmitted in first resource elements among resource elements included in a first resource block of the second transmission band, a subcarrier of the first resource block may overlap subcarriers of resource blocks of the first transmission band among resource blocks of the second transmission band, and second resource elements other than the first resource elements among the resource elements included in the first resource block may be occupied by a designated signal for LTE.

In an embodiment, resource elements among the first resource elements and each having a symbol index of 3 may be occupied by the DM-RS.

In an embodiment, in case that the designated test signal is transmitted in the MBSFN subframe, resource elements among the first resource elements and each having a symbol index of 11 may be occupied by the DM-RS, and in case that the designated test signal is transmitted in a subframe other than the MBSFN subframe, resource elements among the first resource elements and each having a symbol index of 12 may be occupied by the DM-RS.

In an embodiment, a symbol index of a starting position of a resource element for a PDSCH having an RNTI of 0 or 1, among the first resource elements, may be 1, and a symbol index of a starting position of a resource element for a PDSCH having an RNTI of 2, among the first resource elements, may be 3.

In an embodiment, the MBSFN subframe may be a subframe having an index of 9.

In an embodiment, a subcarrier index of each of the resource elements occupied by the DM-RS may be 0, 2, 4, 6, 8, 10, or 12.

In an embodiment, the second resource elements may include resource elements, each having a symbol index of 0.

In an embodiment, the second resource elements may be occupied by a cell-specific reference signal (CRS).

Methods disclosed in the claims and/or methods according to various embodiments described in the specification of the disclosure may be implemented by hardware, software, or a combination of hardware and software.

In case that the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a communication circuit; and
   a processor,
   wherein the processor is configured to:
      generate configuration information for transmitting a designated test signal in a second transmission band of a new radio (NR) cell, the second transmission band at least partially overlapping a first transmission band of a long-term evolution (LTE) cell, and
      transmit the designated test signal based on the configuration information in the second transmission band of the NR cell through the communication circuit,
   wherein the designated test signal is transmitted in first resource elements among resource elements included in a resource block of the second transmission band of the NR cell,
   wherein the resource block of the second transmission band of the NR cell overlaps resource blocks of the first transmission band, and
   wherein second resource elements other than the first resource elements among the resource elements included in the resource block are occupied by a designated signal for LTE.

2. The electronic device of claim 1,
   wherein, in case that the designated test signal is transmitted in a multimedia broadcast single frequency network (MBSFN) subframe, resource elements corresponding to a symbol index of 11 among the first resource elements are occupied by a demodulation reference signal (DM-RS), and
   wherein, in case that the designated test signal is transmitted in a subframe other than the MBSFN subframe, resource elements corresponding to a symbol index of 12 among the first resource elements are occupied by the DM-RS.

3. The electronic device of claim 2, wherein resource elements corresponding to a symbol index of 3 among the first resource elements are occupied by the DM-RS.

4. The electronic device of claim 2, wherein a subcarrier index of each of the resource elements occupied by the DM-RS is 0, 2, 4, 6, 8, 10, or 12.

5. The electronic device of claim 2, wherein a symbol index of a starting position of a resource element for a physical downlink shared channel (PDSCH) using a radio network temporary identifier (RNTI) of 0 or 1, among the first resource elements, is 1.

6. The electronic device of claim 5, wherein a symbol index of a starting position of a resource element for a PDSCH using an RNTI of 2, among the first resource elements, is 3.

7. The electronic device of claim 2, wherein the MBSFN subframe exists in each radio frame.

8. The electronic device of claim 2,
   wherein, in a case of frequency division duplex (FDD), the MBSFN subframe corresponds to a subframe having an index of at least one of 1, 2, 3, 6, 7, or 8, and
   wherein, in a case of time division duplex (TDD), the MBSFN subframe corresponds to a subframe having an index of at least one of 3, 4, 7, 8, or 9.

9. The electronic device of claim 1,
   wherein the NR cell and the LTE cell are associated with same frequency band for dynamic spectrum sharing (DSS), and
   wherein the second resource elements comprise resource elements corresponding to a symbol index of 0.

10. The electronic device of claim 1, wherein the second resource elements are occupied by a cell-specific reference signal (CRS) of the LTE cell.

11. The electronic device of claim 1,
   wherein the designated test signal includes a first signal for a physical downlink control channel (PDCCH) and a second signal for a physical downlink shared channel (PDSCH),
   wherein the first signal is modulated by quadrature phase shift keying (QPSK), and
   wherein the second signal is modulated by 16 quadrature amplitude modulation (QAM).

12. The electronic device of claim 11,
   wherein the first signal is transmitted in resource elements corresponding to a symbol index of 0 and resource elements corresponding to a symbol index 1 among resource elements included in a resource block of which a resource block index is 0, 1, or 2, and
   wherein the second signal is transmitted in resource elements other than resource elements occupied by the first signal among resource elements of the second transmission band.

13. A method performed by an electronic device, the method comprising:
   generating configuration information for transmitting a designated test signal in a second transmission band of a new radio (NR) cell, the second transmission band at least partially overlapping a first transmission band of a long-term evolution (LTE) cell; and transmitting the designated test signal based on the configuration information in the second transmission band of the NR cell, wherein the designated test signal is transmitted in first resource elements among resource elements included in a resource block of the second transmission band of the NR cell, wherein the resource block of the second transmission band of the NR cell overlaps resource blocks of the first transmission band, and wherein second resource elements other than the first resource elements among the resource elements included in the resource block are occupied by a designated signal for LTE.

14. The method of claim 13, wherein resource elements corresponding to a symbol index of 3 among the first resource elements are occupied by a demodulation reference signal (DM-RS).

15. The method of claim 13, wherein the second resource elements are occupied by a cell-specific reference signal (CRS) of the LTE cell.

16. The method of claim 15, wherein the CRS of the LTE cell is identified by configuration information for a rate matching pattern.

17. The method of claim 16, wherein the configuration information includes at least one of a downlink (DL) carrier frequency, a DL bandwidth, a number of CRS ports, information a value of a v-shift, or a list of a MBSFN subframe configuration.

18. The method of claim 13,
wherein the NR cell and the LTE cell are associated with same frequency band for dynamic spectrum sharing (DSS), and
wherein the second resource elements comprise resource elements corresponding to a symbol index of 0.

19. The method of claim 13, wherein, in case that the designated test signal is transmitted in a multimedia broadcast single frequency network (MBSFN) subframe, resource elements corresponding to a symbol index of 11 among the first resource elements are occupied by a demodulation reference signal (DM-RS), and
wherein, in case that the designated test signal is transmitted in a subframe other than the MBSFN subframe, resource elements corresponding to a symbol index of 12 among the first resource elements are occupied by the DM-RS.

20. The method of claim 13, wherein the designated signal for LTE comprises a primary synchronization signal (PSS), a secondary synchronization signal (SSS) and a physical broadcast channel (PBCH).

* * * * *